United States Patent
Bass, Jr. et al.

(10) Patent No.: US 9,965,206 B2
(45) Date of Patent: May 8, 2018

(54) ENHANCED QUEUE MANAGEMENT FOR POWER CONTROL OF DATA STORAGE DEVICE

(71) Applicant: HGST Netherlands B.V., Amsterdam (NL)

(72) Inventors: Carl Dexter Bass, Jr., Pleasanton, CA (US); James Eddy Donaldson, Morgan Hill, CA (US); Sim Cherng Yi Sabrina, Singapore (SG); Hung M. Vu, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 192 days.

(21) Appl. No.: 14/921,832

(22) Filed: Oct. 23, 2015

(65) Prior Publication Data

US 2017/0115913 A1    Apr. 27, 2017

(51) Int. Cl.
G06F 1/32        (2006.01)
G06F 1/26        (2006.01)
G06F 3/06        (2006.01)

(52) U.S. Cl.
CPC .......... G06F 3/0625 (2013.01); G06F 3/0653 (2013.01); G06F 3/0673 (2013.01)

(58) Field of Classification Search
CPC ..................................... G06F 1/32; G06F 1/26
See application file for complete search history.

(56) References Cited

U.S. PATENT DOCUMENTS

| | | | |
|---|---|---|---|
| 5,493,670 | A | 2/1996 | Douglis et al. |
| 5,574,920 | A | 11/1996 | Parry |
| 5,898,880 | A | 4/1999 | Ryu |
| 5,937,433 | A | 8/1999 | Lee et al. |
| 6,553,501 | B1 | 4/2003 | Yokoe |
| 6,809,896 | B2 | 10/2004 | Espeseth et al. |
| 7,010,653 | B2 | 3/2006 | Uchida et al. |
| 7,240,225 | B2 | 7/2007 | Brewer et al. |
| 7,475,265 | B2 | 1/2009 | Oshikawa et al. |
| 7,543,108 | B2 | 6/2009 | Kakihara et al. |
| 7,702,931 | B2 | 4/2010 | Goodrum et al. |

(Continued)

FOREIGN PATENT DOCUMENTS

| | | |
|---|---|---|
| EP | 1605456 B1 | 3/2008 |
| JP | 2003308176 | 10/2003 |

(Continued)

OTHER PUBLICATIONS

Hard Disk Sentinel, Retrieved at http://www.hdsentinel.com/ on May 13, 2014, 2 pages.

(Continued)

*Primary Examiner* — Phil Nguyen (57) ABSTRACT

Systems, methods, and firmware for power control of data storage devices are provided herein. In one example, a data storage device is presented. The data storage device includes a transaction queue configured to enqueue storage operations received over a host interface of the data storage device for storage and retrieval of data on storage media. The data storage device includes a storage controller configured to process a power/current target to establish a dequeue process for storage operations in the transaction queue which operates the data storage device within the power/current target.

19 Claims, 7 Drawing Sheets

(56) References Cited

U.S. PATENT DOCUMENTS

| | | |
|---|---|---|
| 7,721,011 B1 | 5/2010 | Sutera |
| 7,872,825 B2 | 1/2011 | Sanghvi |
| 7,890,780 B2 | 2/2011 | Golasky et al. |
| 8,072,704 B1 | 12/2011 | Goldberg et al. |
| 8,239,589 B1 | 8/2012 | Certain et al. |
| 8,325,555 B2 | 12/2012 | Jeong et al. |
| 8,364,992 B2 | 1/2013 | Guthrie et al. |
| 8,400,893 B2 | 3/2013 | Takada et al. |
| 8,468,375 B2 | 6/2013 | Mori et al. |
| 8,627,124 B2 | 1/2014 | Homeyer |
| 9,195,293 B1 | 11/2015 | Quillen et al. |
| 2002/0002655 A1 | 1/2002 | Hoskins |
| 2003/0149837 A1 | 8/2003 | Coker et al. |
| 2003/0174433 A1 | 9/2003 | Espeseth et al. |
| 2003/0225969 A1 | 12/2003 | Uchida et al. |
| 2005/0210304 A1 | 9/2005 | Hartung et al. |
| 2006/0106980 A1 | 5/2006 | Kobayashi et al. |
| 2006/0159013 A1* | 7/2006 | Lee .................. H04L 5/1446 370/229 |
| 2007/0204124 A1 | 8/2007 | Van Gassel et al. |
| 2007/0226462 A1 | 9/2007 | Scott et al. |
| 2009/0254525 A1* | 10/2009 | Srinivasan .......... G06F 17/3056 |
| 2010/0017542 A1 | 1/2010 | Merry, Jr. et al. |
| 2010/0332871 A1 | 12/2010 | Allalouf et al. |
| 2011/0060927 A1 | 3/2011 | Fillingim et al. |
| 2011/0239013 A1 | 9/2011 | Muller |
| 2012/0066439 A1 | 3/2012 | Fillingim |
| 2012/0078858 A1 | 3/2012 | Nagpal et al. |
| 2012/0331207 A1* | 12/2012 | Lassa .................. G06F 1/3278 711/103 |
| 2013/0142035 A1 | 6/2013 | Sunderrajan |
| 2013/0223254 A1 | 8/2013 | Oguchi |
| 2013/0339599 A1 | 12/2013 | Sundrani |
| 2014/0071558 A1 | 3/2014 | Lu et al. |
| 2014/0075144 A1 | 3/2014 | Sanders et al. |
| 2014/0173306 A1* | 6/2014 | Cooper ................ G06F 1/3221 713/320 |
| 2014/0181561 A1 | 6/2014 | Shippy |
| 2014/0325095 A1 | 10/2014 | Kang et al. |
| 2014/0379940 A1 | 12/2014 | Fulkerson et al. |
| 2015/0101024 A1* | 4/2015 | Leggette ............. H04L 67/1097 726/4 |
| 2015/0106644 A1 | 4/2015 | Lin et al. |
| 2015/0127967 A1 | 5/2015 | Dutton et al. |
| 2015/0135255 A1 | 5/2015 | Theimer et al. |
| 2015/0156204 A1 | 6/2015 | Resch et al. |
| 2015/0201017 A1 | 7/2015 | Hrischuk et al. |
| 2015/0261473 A1* | 9/2015 | Matsuyama .......... G06F 3/0625 711/103 |
| 2016/0085288 A1* | 3/2016 | Khatib .................. G06F 1/3221 713/320 |
| 2016/0085289 A1* | 3/2016 | Khatib .................. G06F 1/3221 713/320 |

FOREIGN PATENT DOCUMENTS

| | | |
|---|---|---|
| JP | 2008003719 | 1/2008 |
| JP | 2010003099 | 1/2010 |
| JP | 2011210024 | 10/2011 |
| JP | 2012523593 | 10/2012 |

OTHER PUBLICATIONS

Hitachi Global Storage Technologies, "Hitachi Feature Tool Usage Instructions", Oct. 19, 2005, 26 pages.

WD Diagnostics, "Software Informer", Retrieved at http://wd-diagnostics.software.informer.com/ on May 13, 2014, 2 pages.

IEEE Xplore Digital Library, "Leveraging Disk Drive Acoustic Modes for Power Management", 2010 IEEE 26th Symposium, May 2-7, 2010, 1 page.

EFD Software, "Drive Power Manager", Retrieved at http://www.drivepowermanager.com/ on May 9, 2014, 1 page.

Molaro, D., et al., Tempo: Disk drive power consumption characterization and modeling, Consumer Electronics, 2009. ISCE '09. IEEE 13th International Symposium, May 2009, abstract only. Available at: http://ieeexplore.ieee.org/xpl/login.jsp?tp=&arnumber=5156863&isnumber=5156791&url=http%3A%2F%2Fieeexplore.ieee.org%2Fstamp%2Fstamp.jsp%3Ftp%3D%26arnumber%3D5156863%26isnumber%3D5156791.

* cited by examiner

ENHANCED QUEUE MANAGEMENT FOR POWER CONTROL OF DATA STORAGE DEVICE

TECHNICAL BACKGROUND

Computer and network systems such as data storage systems, server systems, cloud storage systems, personal computers, and workstations, typically include data storage devices for storing and retrieving data. These data storage devices can include hard disk drives (HDDs), solid state storage drives (SSDs), tape storage devices, optical storage drives, hybrid storage devices that include both rotating and solid state data storage elements, and other mass storage devices.

As computer systems and networks grow in numbers and capability, there is a need for ever increasing storage capacity. Data centers, cloud computing facilities, and other at-scale data processing systems have further increased the need for digital data storage systems capable of transferring and holding immense amounts of data. Data centers can house this large quantity of data storage devices in various rack-mounted and high-density storage configurations.

Data center operators typically attempt to maximize data center utilization by including a high density of storage devices in a given volume. However, these higher densities lead to greater power dissipation with associated heat generation and cooling problems. Power capping has been employed in data centers to set maximum power usages for the various computing systems contained in the data centers. However, power dissipation by individual components of the computing systems is limited to very coarse adjustments, such as sleep modes or powering down of unused computing elements.

OVERVIEW

Systems, methods, and firmware for power control of data storage devices are provided herein. In one example, a data storage device is presented. The data storage device includes a transaction queue configured to enqueue storage operations received over a host interface of the data storage device for storage and retrieval of data on storage media. The data storage device includes a storage controller configured to process at least a power control instruction received over the host interface to establish a dequeue process for storage operations in the transaction queue which operates the data storage device within a power target indicated by the power control instruction.

In another example, a method of operation a data storage device comprising storage media configured to store data for later retrieval is presented. The method includes, in a transaction queue, queuing storage operations that are received over a host interface of the data storage device for storage and retrieval of data on the storage media. The method includes, in a storage controller, processing at least a power control instruction received over the host interface to establish a dequeue process for storage operations in the transaction queue which operates the data storage device within a power target indicated by the power control instruction.

In another example, a data storage device is presented. The data storage device includes rotating storage media configured to store data for later retrieval using one or more read/write heads. The data storage device includes an input queue configured to enqueue storage operations received over a host interface of the data storage device for storage and retrieval of data on the storage media. The data storage device includes a storage processor configured to process at least a power control instruction received over the host interface to establish dequeue sequencing for storage operations in the input queue which operates the data storage device within a power target indicated by the power control instruction. The storage processor is configured to execute the storage operations in accordance with the dequeue process.

DETAILED DESCRIPTION

Data storage systems employ various mass-storage devices, such as hard disk drives, solid state drives, among other storage devices. However, these storage devices can use high levels of power which can lead to excessive power consumption by data centers which aggregate many data storage systems together. In the examples discussed below, various methods, systems, apparatuses, and firmware allow for fine-grained control of power consumption in the various mass storage devices used in data servers and data storage systems. For example, a hard disk drive can be placed into a power capped mode which modifies parameters of the hard disk drive to allow storage operations to fall below a power threshold for that hard disk drive. Other examples of power capping and power control of data storage devices are discussed below.

Figure 1:
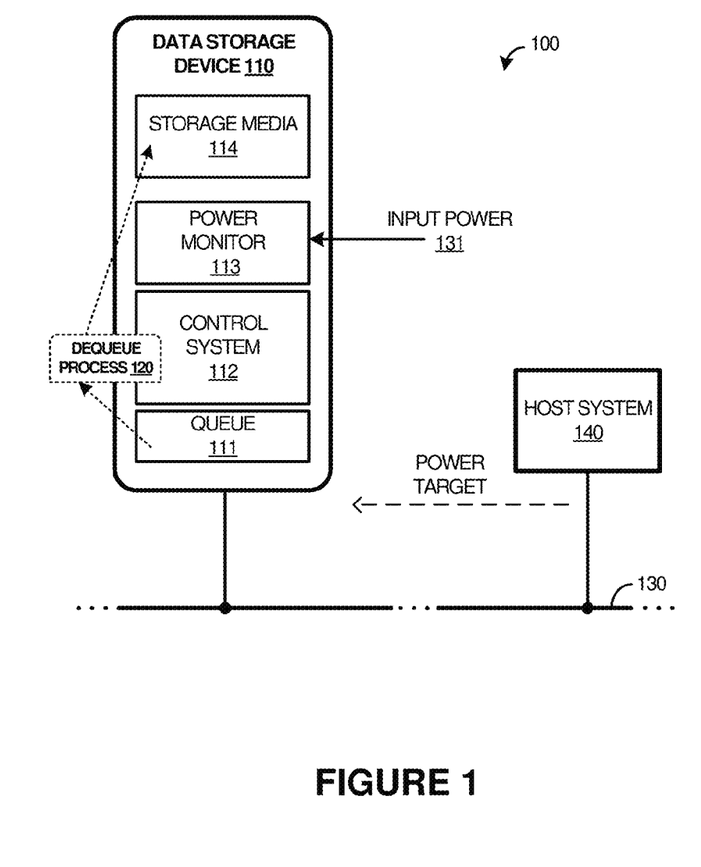
FIG. 1 illustrates a storage system.

In a first example of an enhanced data storage system, FIG. 1 is presented. FIG. 1 is a system diagram illustrating data system 100. System 100 includes data storage device 110 and host system 140. Data storage device 110 and host system 140 communicate over storage link 130. Data storage device 110 can be included in an assembly that includes one or more data storage devices and one or more control systems. In FIG. 1, data storage device 110 includes control system 112 and storage media 114. Control system 112 is communicatively coupled to storage media 114. Although control system 112 is shown as internal to data storage device 110 in this example, it should be understood that in other examples control system 112 can be included in other elements external to data storage device 110. In some examples, data storage device 110 comprises a hard disk drive (HDD) with rotating magnetic storage media, or a hybrid disk drive which incorporates both rotating and solid state storage media.

In operation, data storage device 110 receives read or write operations over storage link 130 issued by host system 140. Responsive to read operations, data storage device 110 can retrieve data stored upon storage media 114 for transfer to host system 140. Responsive to write operations, data storage device 110 stores data on storage media 114. The storage operations are received by control system 112 over storage link 130, and can be received into a transaction queue or input/output operations (IOs) queue, such as queue 111, for handling by control system 112. It should be understood that other components of data storage device 110 are omitted for clarity in FIG. 1, such as chassis, enclosures, fans, interconnect, read/write heads, armatures, preamps, transceivers, processors, amplifiers, motors, servos, enclosures, and other electrical and mechanical elements.

Figure 2:
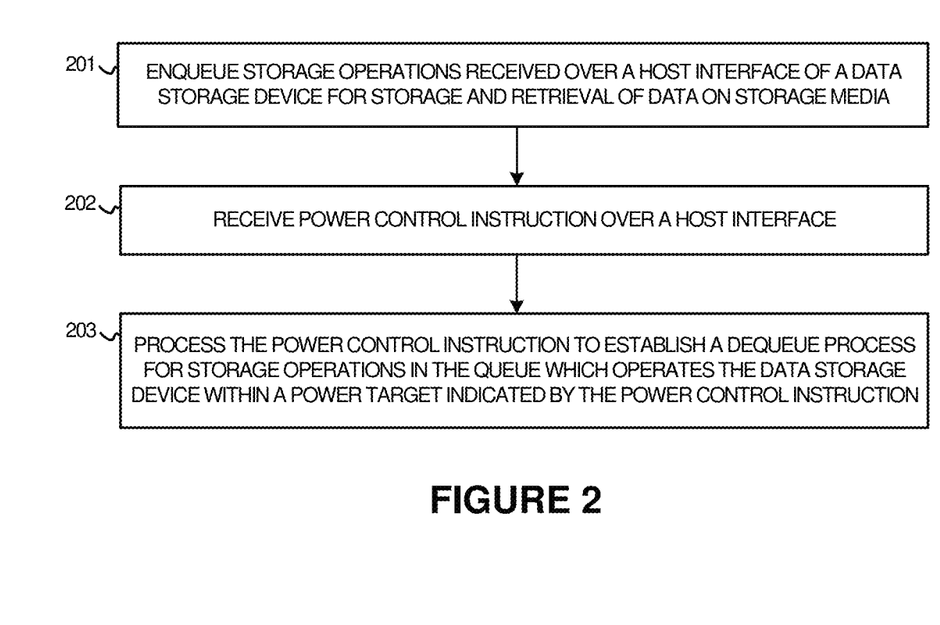
FIG. 2 illustrates a method of operating a data storage device.

To further illustrate the operation of data system 100, FIG. 2 is provided. FIG. 2 is a flow diagram illustrating a method of operating data storage device 110. The operations of FIG. 2 are referenced below parenthetically. In FIG. 2, data storage device 110 enqueues (201) storage operations received over a host interface of data storage device 110 for storage and retrieval of data on storage media 114. In this example, the storage operations can be transferred by host system 140 over link 130 for handling by data storage device 110. These storage operations, such as write or read operations, can be received by data storage device into queue 111 for later handling by control system 112. In many examples, control system 112 includes a host interface for receiving the storage operations and then control system 112 enqueues the storage operations into queue 111.

Data storage device 110 receives (202) a power control instruction over a host interface. In addition to storage operations, other instructions and operations can be transferred by host system 140 for control and communication with data storage device 110. One such control instruction can comprise a power control instruction and can indicate a desired power target comprising a power limit or current draw for data storage device 110. The power target can indicate that host system 140 instructs data storage device 110 not exceed a maximum power dissipation, or for a specified supply voltage not exceed a maximum current draw. These limits can be indicated in watts (W) for power or amps (A) for current (with an accompanying voltage (V) input indication when more than one voltage input is associated with data storage device 110), although other units can be employed. In some examples, the power control instructions comprise one or more T10 standard-compliant power management instructions.

It should be noted that instead of, or in combination with, receiving the power control instruction over the host interface, data storage device 110 can have internally-defined power or current targets. For example, a default power target or current target can be established in data storage device 110 during manufacturing or initial firmware installation. In other examples, a current target or power target can be received during manufacturing or initial firmware installation and then data storage device 110 can employ this power target or current target during operations. Later, a change in the power target or current target can be received over a host interface and employed as described herein by data storage device 110.

Data storage device 110 processes (203) the power control instruction to establish a dequeue process for storage operations in queue 111 which operates the data storage device within a power target indicated by the power control instruction. Over time, many storage operations, such as write operations and read operations, can be received and held in queue 111. These storage operations are many times handled in the order in which received, as in a first-in, first-out (FIFO) scheme. However, the power consumed by data storage device 110 in handling these storage operations in a FIFO manner can lead to higher than desired power dissipation or current draw. Thus, control system 112 establishes a dequeue process or dequeue sequence which alters a power dissipation or current draw of data storage device 110 to comply with the power target indicated in the power control instruction.

Several factors can influence the power or current associated with a dequeue process, such as a depth of queue 111, power dissipation of individual components of data storage device 110, and properties of the storage operations themselves. The depth of queue 111 can vary based on queue depth instructions from host system 140, or by queue depth alterations made by control system 112, which are limited by associated minimum and maximum sizes allowed for queue 111. Power dissipation of the individual components of data storage device 110 can vary due to variations in properties of the electromechanical elements which move read/write (R/W) head components, armatures, servos, motors, and the like. Each storage operation can also have different associated power consumption, based in part on a storage address, a read or write command, and what storage operations are performed prior to and subsequent to a current storage operation.

Control system 112 can minimize power dissipation by selecting a current storage operation from queue 111 based on a previous storage operation selected from queue 111. In rotating magnetic media examples, R/W heads must be positioned over the storage media to read and write data on the media. A first storage operation can be directed to a first storage location on the media, and a second storage operation can be directed to a second storage location on the media distant from the first storage location. Electromechanical components used to move the R/W heads can experience an increased power dissipation or current draw when these two storage locations are more distant from each other or require large changes in movement of the R/W heads from a present location.

Control system 112 can select storage operations from queue 111 for execution by control system 112, such as reading of data from media 114 or writing data to media 114. However, intelligent selection of storage operations from queue 111 can add to latency delays in execution of the storage operations. Additionally, data coherency must be maintained so that certain read or write operations occur in a proper order to prevent overwriting of data being read or reading of incorrect or stale data, among other issues. Control system 112 can establish a search process or search effort for selecting storage operations to dequeue from queue 111. This search effort can vary based on the factors above, such as a present queue depth.

In some examples, a table or other data structure can be established which relates queue depths of queue 111 to estimated power levels of data storage device 110. When a power control instruction is received, control system 112 can select an entry from the table which corresponds to a present queue depth of queue 111 and an estimated power level corresponding to the power target indicated by the power control instruction. The selected entry indicates a dequeue sequence weighting factor. This dequeue sequence weighting factor can relate to a R/W head seek distance threshold for selecting next storage operations to dequeue from queue 111. In some examples, the selected entry relates to an estimated access time (EAT) weighting factor, where EAT is a rotational position metric related to a time delay needed to complete a seek operation of commands in queue 111. Control system 112 can be configured to select the EAT weighting factor from a table relating transaction queue depths and estimated power levels, and employ the EAT weighting factor to select ones of the storage operations from queue 111 during the dequeue process.

Control system 112 can then execute the storage operations, such as by performing read or write operations, as each storage operation is dequeued from queue 111 according to the dequeue process. During the handling of the dequeued storage operations, power monitor 113 monitors power dissipation or current draw of data storage device 110. If an actual power or current draw is above a limit indicated by the power control instruction, then adjustments can be made to the dequeue process, such as by selecting a different estimated power level for the present queue depth from the table indicated above. A specific example of a table relating queue depth to incremental power levels is discussed in FIG. 5.

Returning to the elements of FIG. 1, data storage device 110 includes one or more computer readable storage media 114 accessible via one or more read/write heads and associated electromechanical elements. Data storage device 110 includes power monitor 113 for measuring current draw or power consumption of data storage device. Queue 111 can comprise one or more data storage media which can include a data structure for holding storage operations prior to execution by control system 112. Data storage device 110 also includes processing circuitry, communication interfaces, armatures, preamps, transceivers, processors, amplifiers, motors, servos, enclosures, and other electrical and mechanical elements. Data storage device 110 can also comprise cache systems, chassis, enclosures, fans, interconnect, cabling, or other circuitry and equipment.

Data storage device 110 can comprise a hard disk drive, hybrid disk drive, or other computer readable storage device. Data storage device 110 can include further elements, such as those discussed for hard disk drives 310 in FIG. 3, although variations are possible. The computer readable storage media of data storage device 110 can include rotating magnetic storage media, but can additionally include other media, such as solid state queues or cache systems of data storage device 110. These other media can include solid state storage media, optical storage media, non-rotating magnetic media, phase change magnetic media, spin-based storage media, or other storage media, including combinations, variations, and improvements thereof. In some examples, data storage device 110 comprises a hybrid hard drive employing solid state storage elements in addition to rotating magnetic storage media. Storage media 114 can employ various magnetic storage schemes, such as shingled magnetic recording (SMR), non-shingled magnetic recording, perpendicular magnetic recording (PMR), including combinations, variations, and improvements thereof.

Storage control system 112 includes processing circuitry, communication interfaces, and one or more non-transitory computer-readable storage devices. The processing circuitry can comprise one or more microprocessors and other circuitry that retrieves and executes firmware from memory for operating as discussed herein. The processing circuitry can be implemented within a single processing device but can also be distributed across multiple processing devices or sub-systems that cooperate in executing program instructions. Examples of the processing circuitry include general purpose central processing units, application specific processors, and logic devices, as well as any other type of processing device, combinations, or variations thereof. The communication interfaces can include one or more storage interfaces for communicating with host systems, networks, and the like. The communication systems can include transceivers, interface circuitry, connectors, buffers, microcontrollers, and other interface equipment.

Host system 140 can include processing elements, data transfer elements, and user interface elements. In some examples host system 140 is a central processing unit of a computing device or computing system. In other examples, host system 140 also includes memory elements, data storage and transfer elements, controller elements, logic elements, firmware, execution elements, and other processing system components. In yet other examples, host system 140 comprises a RAID controller processor or storage system central processor, such as a microprocessor, microcontroller, Field Programmable Gate Array (FPGA), or other processing and logic device, including combinations thereof. Host system 140 can include, or interface with, user interface elements which can allow a user of data storage system 100 to control the operations of data storage system 100 or to monitor the status or operations of data storage system 100. These user interface elements can include graphical or text displays, indicator lights, network interfaces, web interfaces, software interfaces, user input devices, or other user interface elements. Host system 140 can also include interface circuitry and elements for handling communications over storage link 130, such as logic, processing portions, buffers, transceivers, and the like.

Storage link 130 can include one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof. Although one bus 130 is shown in FIG. 1, it should be understood that one or more discrete links can be employed between the elements of data storage system 100.

Figure 3:
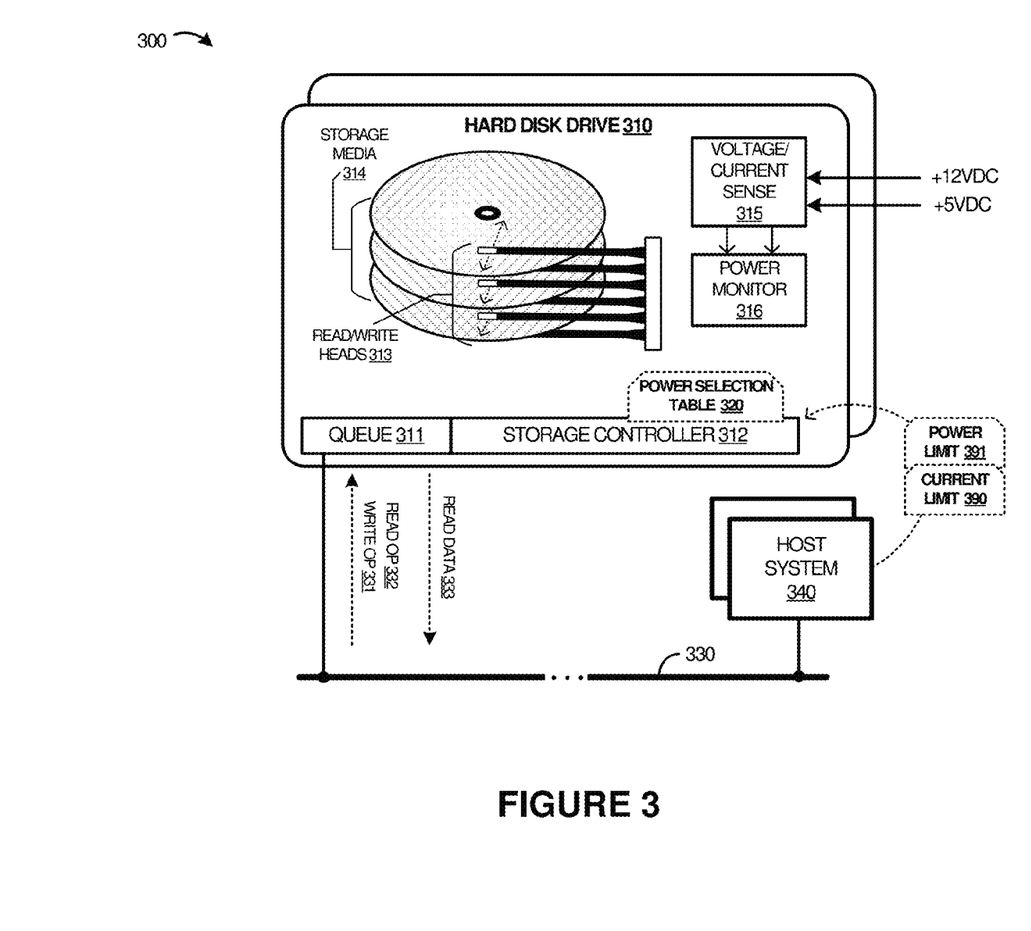
FIG. 3 illustrates a storage system.

As a further example data storage system employing a data storage array, FIG. 3 is presented. FIG. 3 is a system diagram illustrating data storage system 300. Data storage system 300 includes one or more hard disk drives (HDDs), such as HDD 310, and also includes one or more host systems 340. HDD 310 and host system 340 communicate over storage link 330. Various elements of HDD 310 can be included in data storage device 110 of FIG. 1, although variations are possible. Although one HDD is focused on in FIG. 3, it should be understood that more than one HDD could be included and linked to host system 340 or other host systems, such as in a data storage environment employing many hard disk drives in an array.

HDD 310 comprises a hard disk drive, hybrid disk drive, or other computer readable storage device. HDD 310 includes queue 311, storage controller 312, read/write (R/W) heads 313, storage media 314, voltage/current sense circuit 315, and power monitor 316. Storage controller 312 includes one or more power selection tables 320. HDD 310 can include further elements, such as armatures, preamps, transceivers, processors, amplifiers, motors, servos, enclosures, and other electrical and mechanical elements.

Storage controller 312 handles storage operations for HDD 310, such as receiving write storage operations 331 and read storage operations 332 from host system 340 over storage link 330. Write data can be received with the associated write operations for storage on storage media 314, and read data 333 can be provided to hosts responsive to one or more read operations. Storage controller 312 or host system 340 can establish any number of logical volumes or logical storage units for HDD 310 or among other HDDs, which can comprise spanning, redundant arrays, striping, or other data storage techniques. Queue 311 comprises computer-readable storage media which can be included in elements of storage controller 312 as one or more data structures. Storage controller 312 comprises one or more processing systems, such as a microprocessor and associated computer-readable storage media and communication interfaces.

HDD 310 can be included in a redundant array of independent disks (RAID) array, a JBOD device ("Just a Bunch Of Disks"), or a VBOD device ("Virtual Bunch of Disks") which include a plurality of independent disks which can be spanned and presented as one or more logical drives to host system 340. A VBOD device employs one or more shingled magnetic recording (SMR) hard disk drives in an array. However, SMR disks typically have inefficiencies for random writes due to the shingled nature of adjacent tracks for data. The VBOD abstracts the SMR drives and allows random writes and random reads while still having underlying SMR media which ultimately hold the associated data.

Storage link 330 can include one or more links, although a single link is shown in FIG. 3. Storage link 330 can comprise a storage or disk interface, such as Serial Attached ATA (SATA), Serial Attached SCSI (SAS), FibreChannel, Universal Serial Bus (USB), SCSI, InfiniBand, Peripheral Component Interconnect Express (PCIe), Ethernet, Internet Protocol (IP), or other parallel or serial storage or peripheral interfaces, including variations and combinations thereof.

Host system 340 can include one or more computing and network systems, such as personal computers, servers, cloud storage systems, packet networks, management systems, or other computer and network systems, including combinations and variations thereof. In operation, host system 340 issues read and write commands or operations to HDD 310 over storage link 330, among other commands or operations which can include control instructions, metadata retrieval operations, configuration instructions, and the like. Likewise, HDD 310 can transfer read data over storage link 330, among other information such as graphical user interface information, status information, operational information, failure notifications, alerts, and the like.

Figure 4:
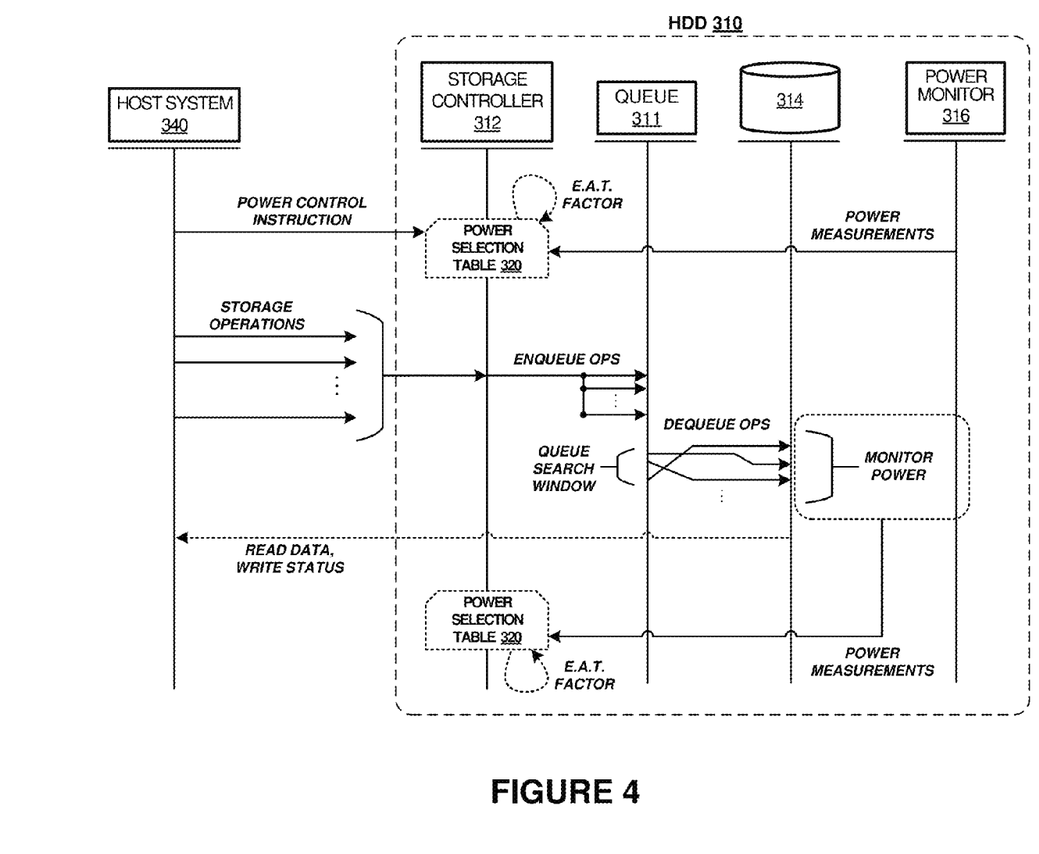
FIG. 4 illustrates a method of operating a data storage system.

To further illustrate the operation of system 300 and HDD 310, FIG. 4 is presented. FIG. 4 is a sequence diagram illustrating a method of operation of system 300. In FIG. 4, HDD 310 can receive various read and write operations from host system 340 for reading and writing data on storage media 314. During these operations, host system 340 might desire to adjust a power cap or power limit for HDD 310, such as when HDD 310 is in a storage array with many HDDs and power limits are desired for the entire array or associated data storage center.

Pursuant to this, host system 340 can transfer one or more power control instructions to HDD 310, such as power limit instruction 391 or current limit instruction 390. These power control instructions can comprise commands which are interpreted by HDD 310 as imposing a limit or target power consumption for HDD 310. In some examples, the power control instructions are included in a standardized command set, such as related to power management interfaces or T10 power management control standards. These power control instructions can indicate power targets or power limits for HDD 310, and can be indicated in a power level (watts) or a current level (amps) for a specific supply voltage. In many examples, HDD 310 can have multiple supply voltages, such as 12 VDC for electromechanical elements (including motors, servos, armature elements), and 5 VDC for logic and processing elements (including microprocessors, queues, host interfaces). A current limit or target current can be specified by host system 340 for any of the voltages used by HDD 310. Alternatively, a total power consumption or power consumption per supply voltage can be specified.

To meet the power targets or power limits indicated in the power control instructions, storage controller 312 can modify operation of HDD 310. Specifically, storage controller 312 modifies dequeue processes for storage operations that have been queued into queue 311 after receipt from host system 340. These storage operations can include read operations or write operations, among other operations, such as traversal operations, metadata operations, and other command/control operations, including combinations thereof. These storage operations are many times handled in the order in which received, as in a FIFO scheme. However, the power consumed by HDD 310 in handling these storage operations in a FIFO manner can lead to higher than desired power dissipation or current draw. Thus, storage controller 312 establishes a dequeue process or dequeue sequence which alters a power dissipation or current draw of HDD 310 to comply with the power target indicated in the power control instruction.

In rotating magnetic media storage drives, such as HDD 310, the power or current associated with executing storage operations can vary based on the movement of electromechanical elements used to position R/W heads over the associated media. In HDD 310, R/W heads 313 are moved over the surfaces of media 314 using associated armatures, voicecoil actuators, or servos and the like. Movements of the R/W heads 313 can be associated with different power dissipations, and can vary based on distance of movement, speed of movement, change in direction, or other factors. These movements are influenced by storage addresses of each storage operation, which indicates where on media 314 that R/W heads are to be positioned. Storage controller 312 can thus alter power dissipations of HDD 310 by carefully selecting storage operations from queue 311 based on predicted movement of R/W heads 313 and predicted power dissipation for those selected storage operations.

To select each storage operation from queue 311, a search effort is applied to queue 311 by storage controller 312. This search effort can be employed to minimize movement of R/W heads 313 from storage operation to storage operation. However, intelligent selection of storage operations from queue 311 can add to processing delays and latency delays in execution of the storage operations. Additionally, data coherency must be maintained so that certain read or write operations occur in a proper order to prevent overwriting of data being read or reading of incorrect or stale data, among other issues.

Figure 5:
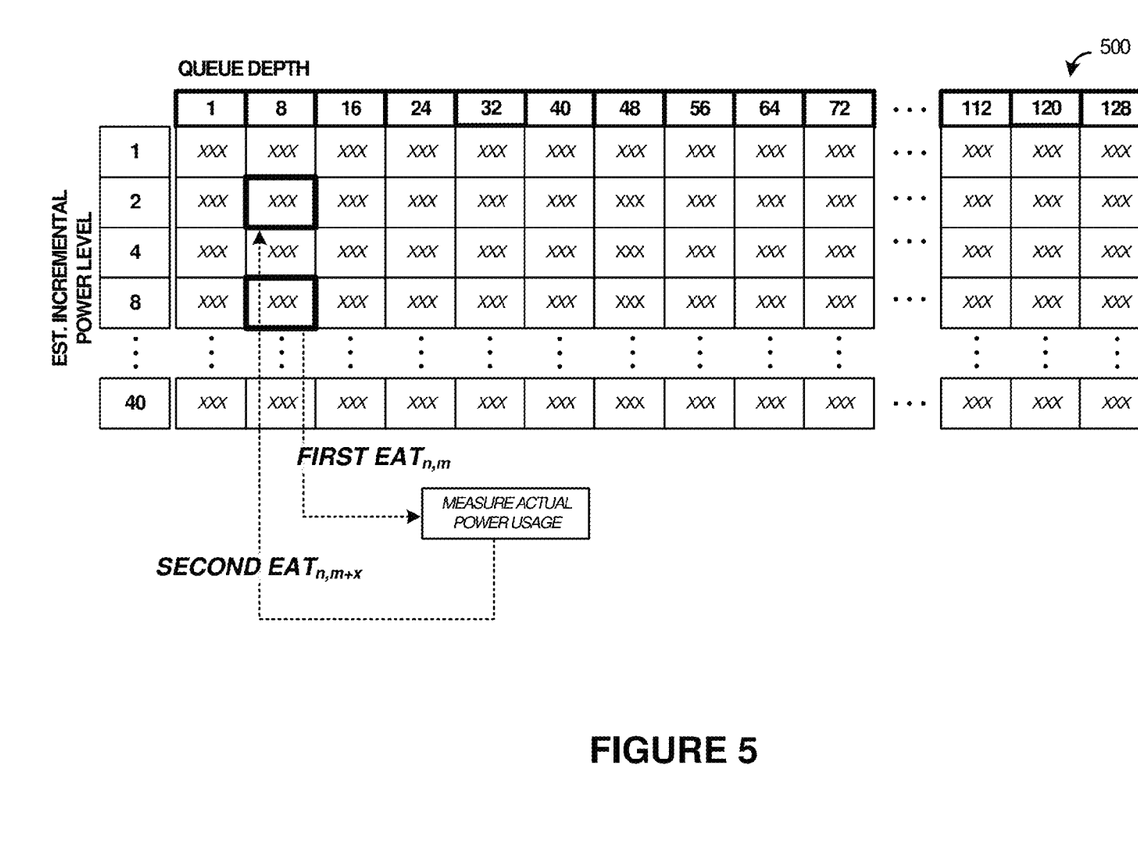
FIG. 5 illustrates a table relating power selections to queue depths.

In this example, power selection table 320 is employed as a look-up table to enhance the establishment of a dequeue process. FIG. 5 shows table 500 as an example of power selection table 320, although variations are possible. In FIG. 5, columns indicate present queue depths and rows indicate incremental estimated power levels, and selections can be made for particular estimated access time (EAT) weighting factors. The queue depth can vary during operation due to changes in a queue depth made by storage controller 312 or instructions by host system 340. Typically, a queue depth is selected to be a fixed value during operation of a data storage device, but may vary depending upon the types of storage operations handled by the data storage device. For example, a HDD tailored to handling sequential write operations might have a different queue depth than a HDD tailored to handling random read/write operations. Other variations are possible. The estimated power level corresponds to different estimated power consumptions by the associated HDD, and can be incremented in various steps or resolutions, such as 50 milliwatts (mW) or 100 mW, among other steps. Although each incremental estimated power level does not have a specific or actual power consumption value determined in FIG. 5, each increasing incremental power level will have an increased associated power consumption.

Relating the elements of FIG. 5 to the operation of elements in FIG. 3, storage controller 312 selects an initial entry from table 500 which corresponds to a present queue depth employed for queue 311 and a desired power target or power limit indicated in the power control instruction. This initial selection might be for "first EAT" factor in FIG. 5, which corresponds to a queue depth of 16 storage operations and an incremental power level of 8.

However, during operation of HDD 310, power is monitored by power monitor 316 and voltage/current sense 315, and if the present power consumption remains above the power target or power limit, then a lower incremental power level can be selected. For example, the first EAT weighting factor selection might provide too high of a power consumption for HDD 310, and thus storage controller 312 selects another lower incremental power level for the same queue depth, such as "second EAT" factor which corresponds in FIG. 5 to a queue depth of 16 and an incremental power level of 2. If the power consumption then drops below the desired level, then HDD 310 can be operated using the second EAT weighting factor. Further refinements can be made to fine tune the power consumption to be under the power limit or power target but still provide for the highest acceptable incremental power level. Although FIG. 5 shows a 40 row table for queue sizes of 1 to 128, it should be understood that other table sizes and granularities can be provided. Moreover, instead of a table, a formulaic selection can be established using the queue depth and incremental power level as inputs to a power equation which outputs an EAT weighting factor.

The selected EAT weighting factor entry of table 500 indicates a dequeue sequence weighting factor. The EAT weighting factor can comprise a parameter or constant which corresponds to a weighting factor for R/W head seek distances considered when each storage operation is selected for execution from queue 311. The estimated access time, or EAT, is a rotational position metric related to a time delay needed to complete a seek operation of commands in queue 311. Storage controller 312 can be configured to select the EAT weighting factor from table 500 relating transaction queue depths and estimated power levels, and employ the EAT weighting factor to select ones of the storage operations from queue 311 during the dequeue process.

Storage controller 312 can then execute the storage operations, such as by performing read or write operations on media 314 with R/W heads 313, as each storage operation is dequeued from queue 311 according to the dequeue process. During the handling of the dequeued storage operations, power monitor 316 monitors power dissipation or current draw of HDD 310, such as by monitoring current draw in voltage/current sense circuitry 315 for each of the +5 VDC and +12 VDC supply powers. If an actual measured power or current draw is above a limit indicated by the power control instruction, then adjustments can be made to the dequeue process, such as by selecting a different incremental power level row in table 500 for the present queue depth, which indicates a different EAT weighting factor. Specifically, storage controller 312 can be configured to process power usage measured during the dequeue process against the power target to identify a power delta, and adjust the EAT weighting factor based at least on the power delta. The EAT weighting factor can be adjusted by selecting a lower incremental power level in a table, such as indicated in FIG. 5.

Figure 6:
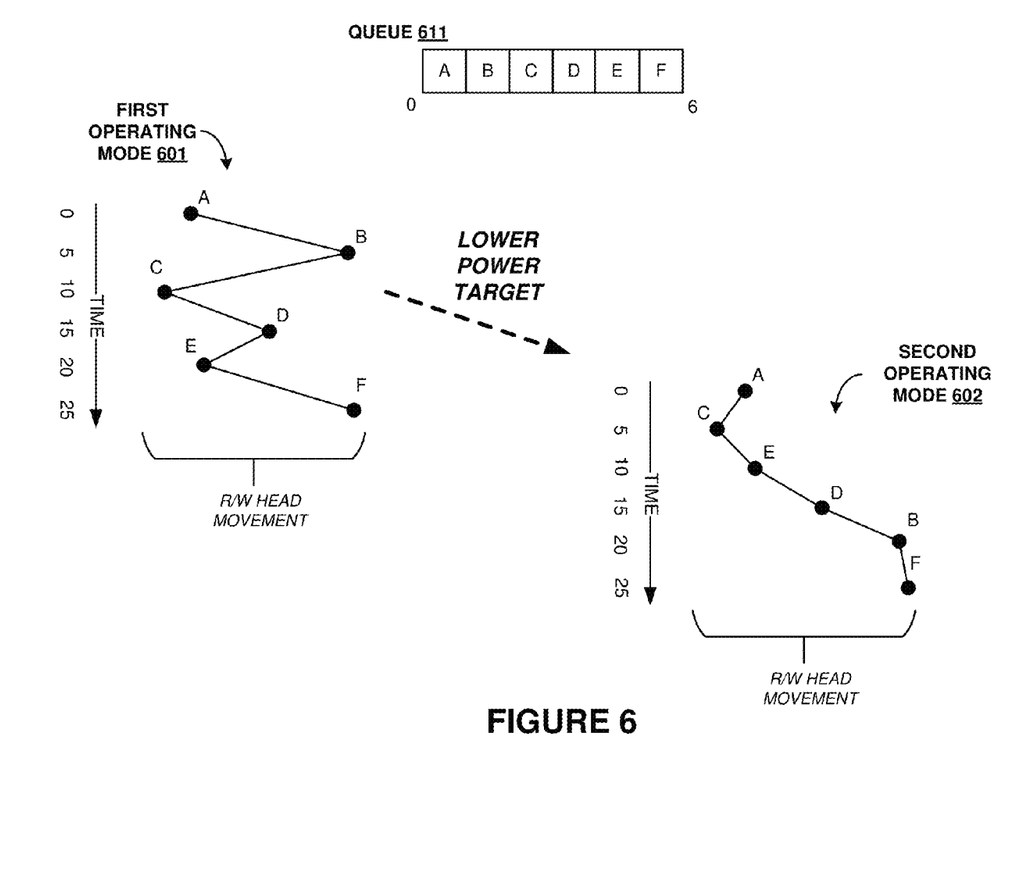
FIG. 6 illustrates dequeue operations.

To further illustrate the effect of the selected EAT weighting factor on the dequeue process, FIG. 6 is presented. FIG. 6 includes two operating modes a dequeue process for a data storage device, with a first operating mode 601 indicating a higher power dequeue process than second operating mode 602. For this example, the data storage device is hard disk drive, and a queue depth of 10 is shown, although other depths can be employed. Though not shown in FIG. 6, hard disk drives typically include a voicecoil actuator or servo for moving an armature that holds the read/write heads. The servo/armature mechanism consumes power when positioning the read/write heads across storage media surfaces to different angular positions. FIG. 3 shows an example of HDD 310 with R/W heads 313 positioned over storage media 314.

In mode 601 of FIG. 6, a first EAT weighting factor is employed which corresponds to a higher power consumption by the associated HDD. In mode 602 of FIG. 6, a second EAT weighting factor is employed which corresponds to a lower power consumption by the associated HDD. The EAT weighting factor indicates a threshold in how much of a seek distance is desired between each selected storage operation that is dequeued from the queue. The EAT, or estimated access time, typically corresponds to a distance that associated R/W heads need to be moved over a storage media, although time delays can accrue from other activity of a R/W head as well.

A search through a queue to find a next storage operation that minimizes successive movement of R/W heads can correspond to less power consumption, on average. A search through the queue to find a next storage operation that minimizes a host latency can correspond to more power consumption, on average. A non-search process might comprise a FIFO process which has no regard for R/W head positioning and merely selects based when a storage operation was queued. A most-aggressive search would always search the entire queue for a storage operation which minimizes the time delay or movement of R/W heads. However, a balanced approach is taken in the examples herein which allows a HDD to keep power consumption below a specified target while maintaining performance at acceptable levels without undue processing effort or latency/delays to find next storage operations to dequeue and execute.

Turning now to mode 601, a first search effort is employed for selecting storage operations to execute from queue 611. Mode 601 corresponds to a first EAT weighting factor. In mode 601, a dequeue sequence of A-B-C-D-E-F is performed. This dequeue sequence leads to large R/W movement distances (and associated times) between each storage operation. Thus, mode 601 corresponds to a first power consumption for the associated HDD.

In contrast, mode 602 shows an example using the same queued storage operations as mode 601, but using a different search effort than in mode 601, corresponding to a second EAT weighting factor. In mode 602, a dequeue sequence of A-C-E-D-B-F is performed. This dequeue sequence leads to smaller R/W movement distances (and associated times) between each storage operation. Thus, mode 602 corresponds to a second power consumption for the associated HDD which is lower than the first power consumption of mode 601.

A more aggressive selection of storage operations, as indicated by the second EAT weighting factor in FIG. 6, can lead to a sequence of storage operations which minimizes time/distance for R/W head positioning. In further examples, a storage controller can be configured to process power usage measured during a current dequeue process that uses a first EAT weighting factor against a power target to identify a power delta. When the power delta indicates the power usage is greater than the power target, the storage controller can be configured to determine second EAT weighting factor for the dequeue process to dequeue storage operations from the queue to reduce the power usage to below the power target.

In a further example, all entries in queue 611 can be considered for the next storage operation selected, but a time threshold can be established using the EAT weighting factor. This time threshold can lead to selection of the next storage operation from the queue as corresponding to R/W head movement delay from a current R/W head position that is less than the time threshold. However, when more than one entry in the queue meets this time criteria, then further thresholds can be employed, such as the first entry encountered which meets the time criteria or the entry with the least amount of time delay.

Advantageously, in the examples herein, various power-controlled operations can be established for data storage devices, such as HDDs. Processing resources of associated storage controller or control systems can be handled more efficiently by selecting storage operations from associated queues to meet power limits while maintaining sufficient performance. Lookup tables can be employed to further speed up dequeue processes by quickly establishing EAT weighting factors, or other dequeue weighting factors. These factors can allow efficient movement of R/W heads and associated electromechanical components to maintain operation within power targets indicated by a host system.

Figure 7:
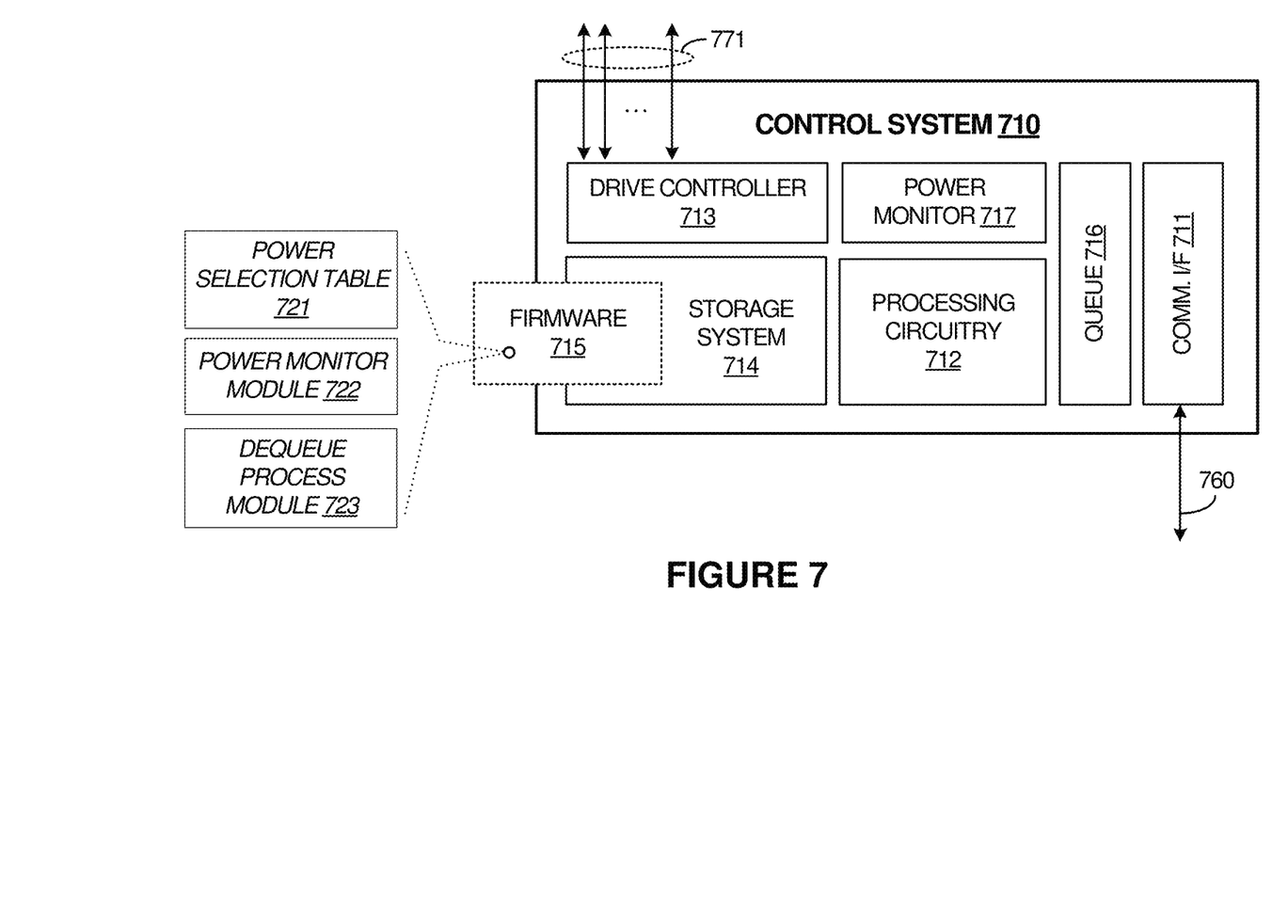
FIG. 7 illustrates a control system.

FIG. 7 is a block diagram illustrating control system 710. Control system 710 handles storage operations for a storage assembly. Control system 710 can be an example of control system 112 of FIG. 1, storage controller 312 of FIG. 3, or included in elements of host system 340 of FIG. 3, although variations are possible. When control system 710 is included in a data storage drive, control system 710 receives storage operations from host systems over storage link 760 by host interface 711 into queue 716. Write data can be received in one or more write operations, and read data can be provided to hosts responsive to one or more read operations.

Control system 710 includes host interface (I/F) 711, processing circuitry 712, drive controller 713, storage system 714, queue 716, and power monitor 717. Furthermore, control system 710 includes firmware 715 which includes power selection table 721, power monitor module 722, dequeue process module 723 which, when executed by at least processing circuitry 712, operates as described below.

Host interface 711 includes one or more storage interfaces for communicating with host systems, networks, and the like over at least link 760. Host interface 711 can comprise transceivers, interface circuitry, connectors, buffers, microcontrollers, and other interface equipment. Host interface 711 can also receive storage operations over link 760 and place the storage operations into one or more I/O queues, such as queue 716, which buffer these storage operations for handling by processing circuitry 712. Link 760 can include one or more Ethernet interfaces, SATA interfaces, SAS interfaces, FibreChannel interfaces, USB interfaces, SCSI interfaces, InfiniBand interfaces, NVMe interfaces, or IP interfaces, which allows for the host system to access the storage capacity of HDD assembly.

Processing circuitry 712 can comprise one or more microprocessors and other circuitry that retrieves and executes firmware 715 from storage system 714. Processing circuitry 712 can be implemented within a single processing device but can also be distributed across multiple processing devices or sub-systems that cooperate in executing program instructions. Examples of processing circuitry 712 include general purpose central processing units, application specific processors, and logic devices, as well as any other type of processing device, combinations, or variations thereof. In some examples, processing circuitry 712 includes a system-on-a-chip device or microprocessor device, such as an Intel Atom processor, MIPS microprocessor, and the like.

Drive controller 713 can include one or more drive control circuits and processors which can control various data media handling among the various storage media of a storage device. Drive controller 713 also includes storage interfaces 761, to couple to the various data storage media. In some examples, drive controller 713 handles management of a particular recording technology, such as flash, optical, shingled magnetic recording (SMR), perpendicular magnetic recording (PMR), heat assisted magnetic recording (HAMR), solid state media such as flash media, or other recording technology. As mentioned herein, elements and functions of drive controller 713 can be integrated with processing circuitry 313.

Queue 716 can comprise any data structure included on a non-transitory computer readable storage media readable by processing circuitry 712 or drive controller 713 and capable of storing storage operations and associated data prior to handling by processing circuitry 712 or drive controller 713. Queue 716 can be implemented in a single storage device but can also be implemented across multiple storage devices or sub-systems co-located or distributed relative to each other. Hardware elements associated with queue 716 can comprise additional elements, such as a controller, capable of communicating with processing circuitry 712 or drive controller 713. Examples of storage media of queue 716 include random access memory, read only memory, magnetic disks, optical disks, flash memory, SSDs, phase change memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Power monitor 717 can comprise one or more sensing elements for measuring power consumption, current draw, voltage levels, or other associated power related properties of a storage device associated with control system 710, such as current draws or power dissipations. Power monitor 717 can comprise current sensing elements, voltage sensing elements, power consumption processing elements, or other power sensing elements. Current sensing elements can include current sense resistors, operational amplifiers, comparators, magnetic current sensing elements, Hall Effect sensing elements, or other current sensing elements. Voltage sensing elements can include voltage dividers, operational amplifiers, or other analog or digital voltage sensing elements. Power monitor 717 can also include various interfaces for communicating measured power information, such as to processing circuitry 712. These interfaces can include transceivers, analog-to-digital conversion elements, amplifiers, filters, signal processors, among other elements. In some examples, power monitor 717 can each include microcontroller elements to control the operations of power monitor 717. In further examples, power monitor 717 includes one or more control or communication interfaces for communicating with external current or power sensing elements.

Storage system 714 can comprise any non-transitory computer readable storage media readable by processing circuitry 712 or drive controller 713 and capable of storing firmware 715. Storage system 714 can include volatile and nonvolatile, removable and non-removable media implemented in any method or technology for storage of information, such as computer readable instructions, data structures, program modules, or other data. In addition to storage media, in some implementations storage system 714 can also include communication media over which firmware 715 can be communicated. Storage system 714 can be implemented as a single storage device but can also be implemented across multiple storage devices or sub-systems co-located or distributed relative to each other. Storage system 714 can comprise additional elements, such as a controller, capable of communicating with processing circuitry 712. Examples of storage media of storage system 714 include random access memory, read only memory, magnetic disks, optical disks, flash memory, SSDs, phase change memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Firmware 715 can be implemented in program instructions and among other functions can, when executed by control system 710 in general or processing circuitry 712 in particular, direct control system 710 or processing circuitry 712 to operate data storage systems as described herein. Firmware 715 can include additional processes, programs, or components, such as operating system software, database software, or application software. Firmware 715 can also comprise software or some other form of machine-readable processing instructions executable by processing circuitry 712.

In at least one implementation, the program instructions can include first program instructions that direct control system 710 to monitor power consumption of a data storage device associated with control system 710 (power monitor module 722), determine when power consumption is above a target power or current level, select a dequeue weighting factor based on a power target (dequeue process module 723) using at least power selection table 721 which relates queue depths to incremental power levels, and use the dequeue weighting factor to select ones of enqueued storage operations for execution (dequeue process module 723), among other operations.

In general, firmware 715 can, when loaded into processing circuitry 712 and executed, transform processing circuitry 712 overall from a general-purpose computing system into a special-purpose computing system customized to operate as described herein. Encoding firmware 715 on storage system 714 can transform the physical structure of storage system 714. The specific transformation of the physical structure can depend on various factors in different implementations of this description. Examples of such factors can include, but are not limited to the technology used to implement the storage media of storage system 714 and whether the computer-storage media are characterized as primary or secondary storage. For example, if the computer-storage media are implemented as semiconductor-based memory, firmware 715 can transform the physical state of the semiconductor memory when the program is encoded therein. For example, firmware 715 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage device, comprising:
   storage media configured to store data for later retrieval;
   a transaction queue configured to enqueue storage operations received over a host interface of the data storage device for storage and retrieval of data on the storage media; and
   a storage controller configured to:
      process at least a power control instruction received over the host interface to establish a dequeue process for storage operations in the transaction queue which operates the data storage device within a power target indicated by the power control instruction;
      determine an estimated access time (EAT) weighting factor for the dequeue process based at least on a present transaction queue depth and the power target; and
      based at least on a power delta against the power target indicating power usage of the dequeue process is greater than the power target, identify a different EAT weighting factor that reduces the power usage to below the power target for further dequeue processes.

2. The data storage device of claim 1, wherein the storage controller is further configured to process power usage measured during the dequeue process against the power target to identify a power delta, and adjust the EAT weighting factor based at least on the power delta.

3. The data storage device of claim 1, wherein the storage controller is further configured to select the EAT weighting factor from a table relating transaction queue depths and estimated power levels and employ the EAT weighting factor to select the storage operations from the transaction queue during the dequeue process.

4. The data storage device of claim 1, wherein the storage controller is further configured to process the power usage measured during the dequeue process against the power target to identify the power delta; and
   wherein the storage controller is configured to identify the different EAT weighting factor that reduces the power usage to below the power target for further dequeue processes from a data structure relating estimated power levels to transaction queue depths.

5. The data storage device of claim 1, further comprising:
   a power monitor configured to measure the power usage by the data storage device during at least the storage operations; and
   wherein the storage controller is further configured to process the power usage against the power target to adjust dequeue sequencing for the transaction queue to alter read/write head seek behavior of the data storage device and reduce the power usage to within the power target.

6. The data storage device of claim 1, wherein the power control instruction comprises a limit on at least one of a power dissipation or current draw for the data storage device.

7. The data storage device of claim 1, wherein the power target is indicated as a desired current for a specified supply voltage of the data storage device.

8. The data storage device of claim 1, wherein the storage controller is further configured to execute the storage operations in accordance with the dequeue process.

9. A method of operation a data storage device comprising storage media configured to store data for later retrieval, the method comprising:
in a transaction queue, queuing storage operations that are received over a host interface of the data storage device for storage and retrieval of data on the storage media;
in a storage controller, processing at least a power control instruction received over the host interface to establish a dequeue process for storage operations in the transaction queue which operates the data storage device within a power target indicated by the power control instruction;
in the storage controller, determining an estimated access time (EAT) weighting factor for the dequeue process based at least on a present transaction queue depth and the power target; and
in the storage controller, based at least on a power delta against the power target indicating power usage of the dequeue process is greater than the power target, identifying a different EAT weighting factor that reduces the power usage to below the power target for further dequeue processes.

10. The method of claim 9, further comprising:
in the storage controller, processing power usage measured during the dequeue process against the power target to identify a power delta, and adjusting the EAT weighting factor based at least on the power delta.

11. The method of claim 9, further comprising:
in the storage controller, selecting the EAT weighting factor from a table relating transaction queue depths and estimated power levels and employing the EAT weighting factor to select the storage operations from the transaction queue during the dequeue process.

12. The method of claim 9, further comprising:
in the storage controller, processing the power usage measured during the dequeue process against the power target to identify the power delta; and
in the storage controller, identifying the different estimated access time (EAT) weighting factor that reduces the power usage to below the power target for further dequeue processes from a data structure relating estimated power levels to transaction queue depths.

13. The method of claim 9, further comprising:
in a power monitor, measuring the power usage by the data storage device during storage operations; and
in the storage controller, processing the power usage against the power target to adjust dequeue sequencing for the transaction queue to alter read/write head seek behavior of the data storage device and reduce the power usage to within the power target.

14. The method of claim 9, wherein the power control instruction comprises a limit on at least one of a power dissipation or current draw for the data storage device.

15. The method of claim 9, wherein the power target is indicated as a desired current for a specified supply voltage of the data storage device.

16. The method of claim 9, further comprising:
executing the storage operations in accordance with the dequeue process.

17. A data storage device, comprising:
rotating storage media configured to store data for later retrieval using one or more read/write heads;
an input queue configured to enqueue storage operations received over a host interface of the data storage device for storage and retrieval of data on the storage media;
a power monitor configured to measure power usage by the data storage device during the storage operations;
a storage processor configured to:
process at least a power target to establish dequeue sequencing for storage operations in the input queue which operates the data storage device within the power target;
execute the storage operations in accordance with the dequeue sequencing; and
process the power usage against the power target to adjust the dequeue sequencing for the input queue to alter seek behavior of the one or more read/write heads of the data storage device and reduce the power usage to within the power target.

18. A data storage device, comprising:
storage media configured to store data for later retrieval;
a transaction queue configured to enqueue storage operations received over a host interface of the data storage device for storage and retrieval of data on the storage media; and
a storage controller configured to:
process at least a power control instruction received over the host interface to establish a dequeue process for storage operations in the transaction queue which operates the data storage device within a power target indicated by the power control instruction;
process power usage measured during the dequeue process against the power target to identify a power delta; and
based at least on the power delta indicating the power usage is greater than the power target, identify a different estimated access time (EAT) weighting factor that reduces the power usage to below the power target for further dequeue processes from a data structure relating estimated power levels to transaction queue depths.

19. A data storage device, comprising:
storage media configured to store data for later retrieval;
a transaction queue configured to enqueue storage operations received over a host interface of the data storage device for storage and retrieval of data on the storage media;
a power monitor configured to measure power usage by the data storage device during at least the storage operations; and
a storage controller configured to:
process at least a power control instruction received over the host interface to establish a dequeue process for storage operations in the transaction queue which operates the data storage device within a power target indicated by the power control instruction; and
process the power usage against the power target to adjust dequeue sequencing for the transaction queue to alter read/write head seek behavior of the data storage device and reduce the power usage to within the power target.

* * * * *